(12) United States Patent
Bhattacharyya

(10) Patent No.: US 11,893,367 B2
(45) Date of Patent: *Feb. 6, 2024

(54) SOURCE CODE CONVERSION FROM APPLICATION PROGRAM INTERFACE TO POLICY DOCUMENT

(71) Applicant: Capital One Services, LLC, McLean, VA (US)

(72) Inventor: Saurav Bhattacharyya, Brambleton, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/145,094

(22) Filed: Dec. 22, 2022

(65) Prior Publication Data

US 2023/0128866 A1 Apr. 27, 2023

Related U.S. Application Data

(63) Continuation of application No. 17/448,237, filed on Sep. 21, 2021, now Pat. No. 11,537,367.

(51) Int. Cl.
G06F 8/40 (2018.01)
G06F 8/60 (2018.01)

(52) U.S. Cl.
CPC ............... *G06F 8/40* (2013.01); *G06F 8/60* (2013.01)

(58) Field of Classification Search
CPC .................................... G06F 8/40; G06F 8/60
See application file for complete search history.

(56) References Cited

U.S. PATENT DOCUMENTS

| 7,249,345 | B2 | 7/2007 | Zorc |
| 8,789,012 | B1 | 7/2014 | Tolle |
| 10,261,810 | B2 * | 4/2019 | McCourtney ........... G06F 8/437 |

(Continued)

OTHER PUBLICATIONS

M. Eichberg, M. Meizini, T. Schafer, C. Beringer and K. M. Hamel, "Enforcing system-wide properties," 2004 Australian Software Engineering Conference. Proceedings., Melbourne, VIC, Australia, 2004, pp. 158-167, doi: 10.1109/ASWEC.2004.1290468. (Year: 2004).*

(Continued)

*Primary Examiner* — Hanh Thi-Minh Bui
(74) *Attorney, Agent, or Firm* — Harrity & Harrity, LLP

(57) ABSTRACT

In some implementations, a device may receive source code associated with an application program interface (API) configured to execute on a dedicated runtime infrastructure. The device may generate an executable policy document including machine-readable text based on one or more code sections in the source code that implement one or more function calls associated with one or more function call types. The device may invoke a validation utility to cross-check the executable policy document against a design document associated with the API. The device may deploy the executable policy document in a common runtime environment that includes a shared runtime infrastructure to support multiple executable policy documents based on the validation utility indicating that the executable policy document satisfies functional requirements described in the design document associated with the API.

22 Claims, 5 Drawing Sheets

(56) References Cited

U.S. PATENT DOCUMENTS

| | | |
|---|---|---|
| 11,294,939 B2 | 4/2022 | Malhotra et al. |
| 11,475,002 B1 * | 10/2022 | Raghavan ......... G06F 16/90335 |
| 11,537,367 B1 | 12/2022 | Bhattacharyya |
| 2018/0196643 A1 | 7/2018 | Dolby et al. |

OTHER PUBLICATIONS

Meyerovich et al., "CONSCRIPT: Specifying and Enforcing Fine-Grained Security Policies for JavaScript in the Browser," IEEE Symposium on Security and Privacy, 2010, pp. 481-496, DOI: 10.1109/SP.2010.36.

* cited by examiner

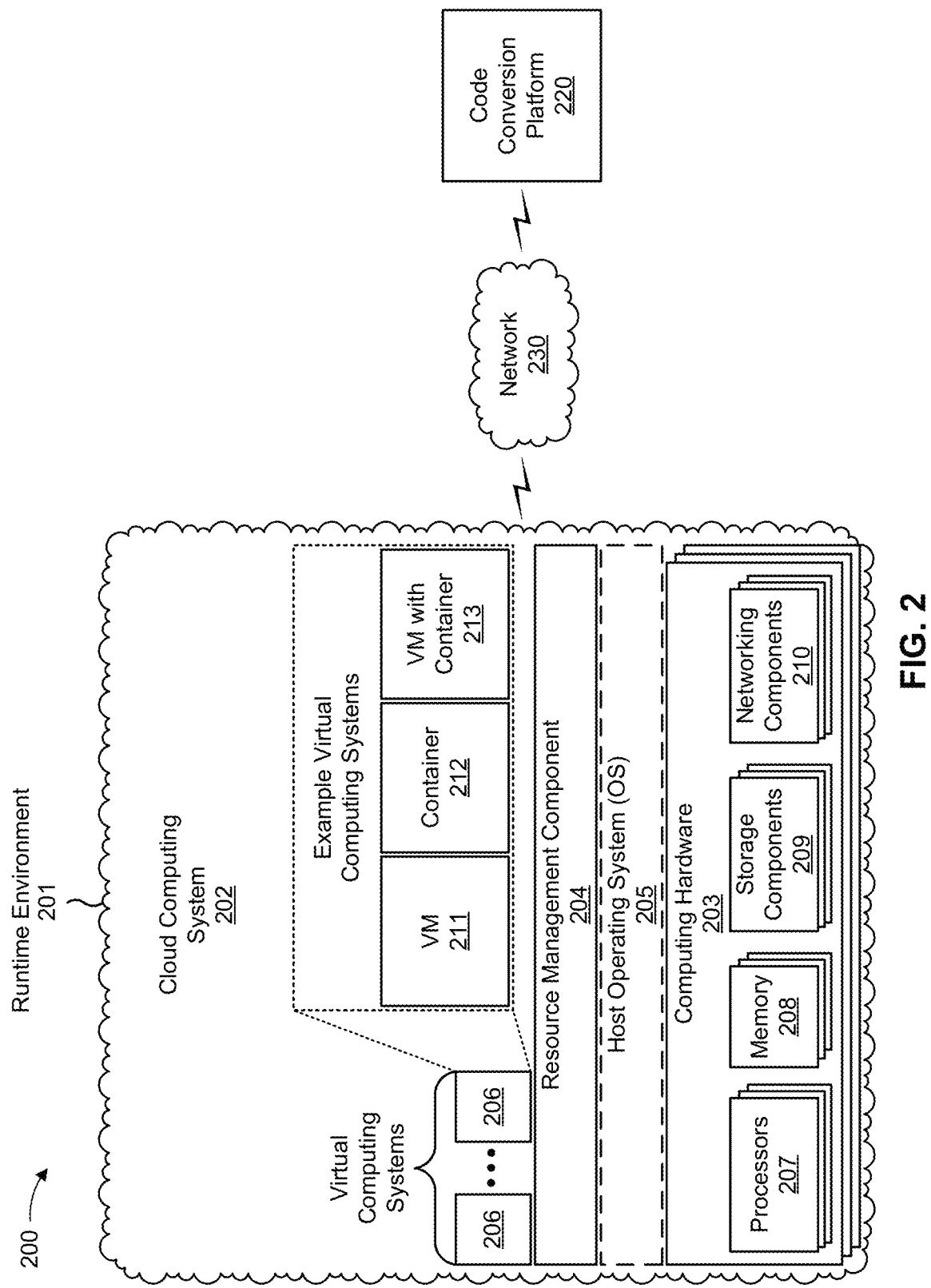

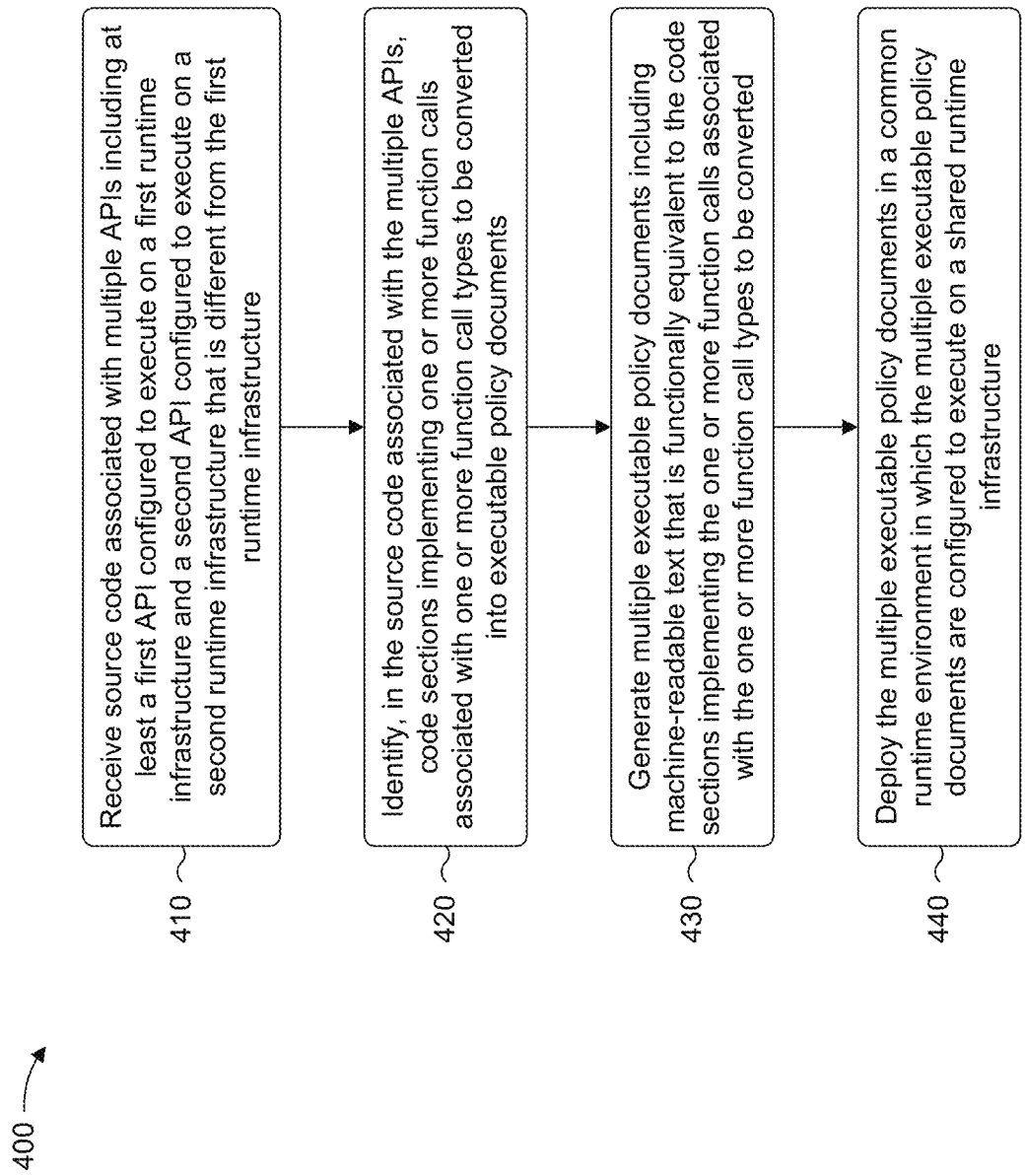

SOURCE CODE CONVERSION FROM APPLICATION PROGRAM INTERFACE TO POLICY DOCUMENT

RELATED APPLICATION

This application is a continuation of U.S. patent application Ser. No. 17/448,237, filed Sep. 21, 2021 (now U.S. Pat. No. 11,537,367), which is incorporated herein by reference in its entirety.

BACKGROUND

An application program interface (API) is a software intermediary that allows unrelated applications to communicate with each other. For example, the API generally acts like a bridge to take a request or a message from a first application, translate the request or message into a format compatible with a second application and/or perform one or more protocols based on what the API is programmed to do, and then deliver the request or message to the second application. APIs may use various routines, tools, and/or protocols to specify how different software components and/or applications are to function together. In general, an API may be public or private. Public APIs typically work with user-facing applications and provide organizations with opportunities to connect with users through various apps, mobile devices, and/or browsers, among other examples. Private APIs typically work on an infrastructure back end, streamlining operations and creating tools to serve to end users.

SUMMARY

Some implementations described herein relate to a system for converting source code. The system may include one or more memories and one or more processors coupled to the one or more memories. The one or more processors may be configured to receive source code associated with multiple application program interfaces (APIs) including at least a first API configured to execute on a first runtime infrastructure and a second API configured to execute on a second runtime infrastructure that is different from the first runtime infrastructure. The one or more processors may be configured to identify, in the source code associated with the multiple APIs, code sections implementing one or more function calls associated with one or more function call types to be converted into executable policy documents. The one or more processors may be configured to generate multiple executable policy documents including machine-readable text that is functionally equivalent to the code sections implementing the one or more function calls associated with the one or more function call types to be converted. The one or more processors may be configured to deploy the multiple executable policy documents in a common runtime environment in which the multiple executable policy documents are configured to execute on a shared runtime infrastructure.

Some implementations described herein relate to a method for converting source code. The method may include receiving, by a code conversion device, source code associated with an API configured to execute on a dedicated runtime infrastructure. The method may include identifying, by the code conversion device, one or more code sections in the source code that implement one or more function calls associated with one or more function call types. The method may include generating, by the code conversion device, an executable policy document including machine-readable text based on the one or more code sections implementing the one or more function calls associated with the one or more function call types. The method may include invoking, by the code conversion device, a validation utility to cross-check the executable policy document against a design document associated with the API. The method may include deploying, by the code conversion device, the executable policy document in a common runtime environment that includes a shared runtime infrastructure to support multiple executable policy documents based on the validation utility indicating that the executable policy document satisfies functional requirements described in the design document associated with the API.

Some implementations described herein relate to a non-transitory computer-readable medium that stores a set of instructions for a code conversion platform. The set of instructions, when executed by one or more processors of the code conversion platform, may cause the code conversion platform to receive source code associated with multiple APIs including at least a first API configured to execute on a first runtime infrastructure and a second API configured to execute on a second runtime infrastructure that is different from the first runtime infrastructure. The set of instructions, when executed by one or more processors of the code conversion platform, may cause the code conversion platform to identify, in the source code associated with the multiple APIs, code sections implementing one or more function calls associated with one or more function call types to be converted into executable policy documents. The set of instructions, when executed by one or more processors of the code conversion platform, may cause the code conversion platform to generate multiple executable policy documents including machine-readable text that is functionally equivalent to the code sections implementing the one or more function calls associated with the one or more function call types to be converted. The set of instructions, when executed by one or more processors of the code conversion platform, may cause the code conversion platform to invoke a validation utility to cross-check the multiple executable policy documents against design documents associated with the multiple APIs. The set of instructions, when executed by one or more processors of the code conversion platform, may cause the code conversion platform to deploy the multiple executable policy documents in a common runtime environment in which the multiple executable policy documents are configured to execute on a shared runtime infrastructure based on the validation utility indicating that the multiple executable policy documents satisfy functional requirements described in the design documents associated with the multiple APIs.

BRIEF DESCRIPTION OF THE DRAWINGS

FIG. 2 is a diagram of an example environment in which systems and/or methods described herein may be implemented.

FIG. 4 is a flowchart of an example process relating to converting source code from an API to a lightweight document format.

DETAILED DESCRIPTION

Figure 1A:
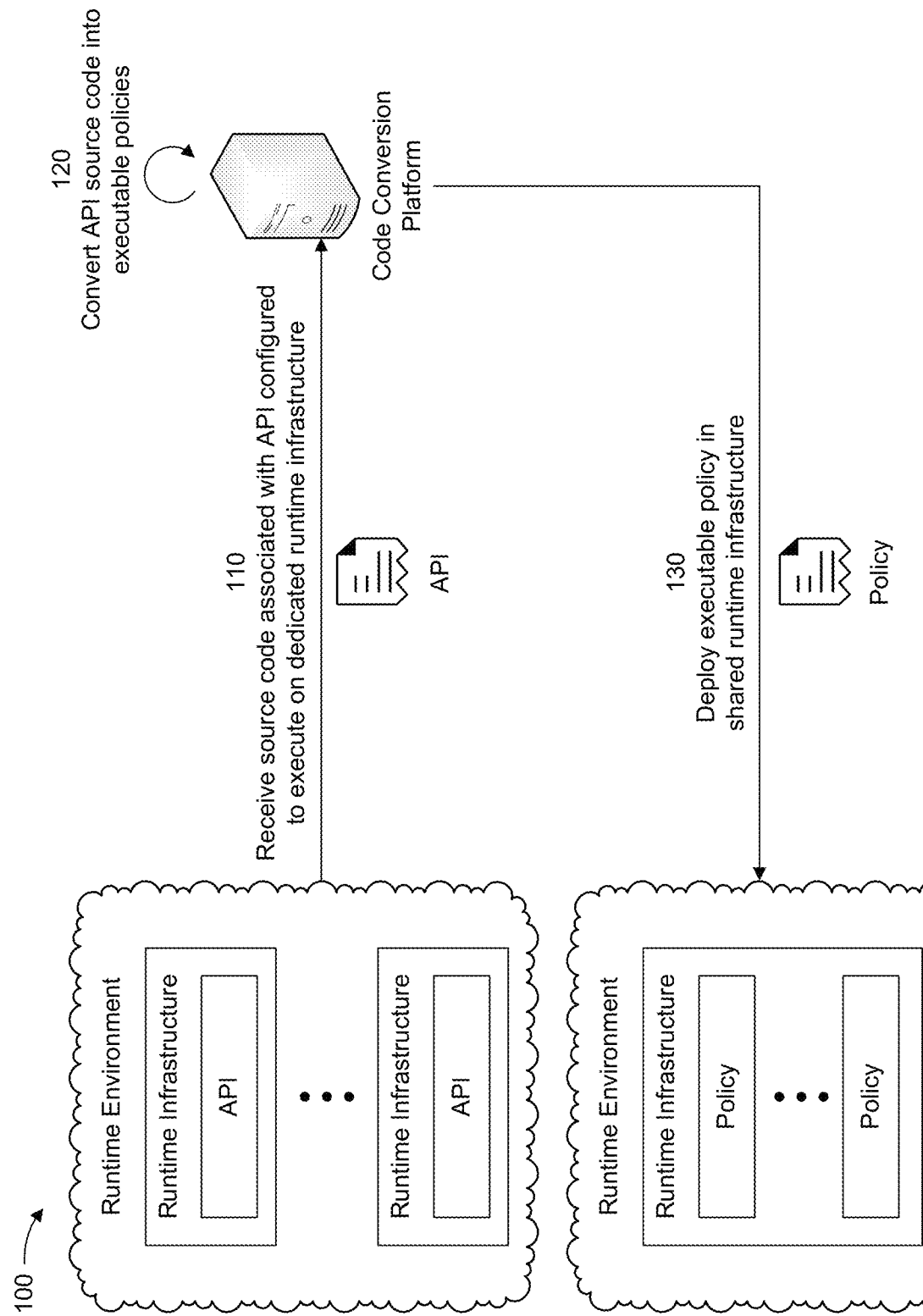
FIGS. 1A-1B are diagrams of an example implementation relating to converting source code from an application program interface (API) to a lightweight document format.

The following detailed description of example implementations refers to the accompanying drawings. The same reference numbers in different drawings may identify the same or similar elements.

Enterprise software, also known as enterprise application software, is computer software used to satisfy the needs of an organization such as a business, a school, and/or a government, among other examples. For example, within an organization, enterprise software may include various computer programs that have common business applications and/or provide business-oriented services unique to the organization. Enterprise software is often designed to store, manipulate, retrieve, analyze, display, and/or otherwise interact with large amounts of potentially complex data and to support or automate business processes with the data. Accordingly, in contrast to a single-user application that is typically executed on a personal computer or a personal device to support one user at a time, enterprise software is typically hosted and/or executed on a network-based runtime infrastructure and provides interfaces to support communication between different enterprise applications in order to provide simultaneous services to many users, typically over a computer network.

For example, enterprise software deployed in a production environment (e.g., a cloud infrastructure or other computer system(s) providing a runtime infrastructure to deploy, host, and execute software) may be developed based on an application program interface (API) paradigm, where an API is developed to implement business logic and/or provide integration with other APIs or data streams to get and/or send data. In many cases, the APIs may be written in or otherwise built on compiled programming languages such as Java and/or Go, whereby each API that is deployed in the production environment has various configuration elements that are used by the supporting runtime infrastructure. Accordingly, in cases where enterprise software includes multiple APIs that are deployed and managed in a production environment, each API may require a separate runtime infrastructure (e.g., hardware resources) to run in the production environment. Consequently, as the quantity of APIs deployed in the production environment increases, the production environment requires a larger runtime infrastructure in order to support the APIs that are deployed and executed in the production environment, which can significantly increase resource overhead and infrastructure costs in addition to increasing a need to provide software governance, management, and/or cyber vulnerability remediation for each API.

Some implementations described herein relate to a code conversion platform that may convert source code from an API format to a lightweight document format. In some implementations, the lightweight document format may expose an extensible markup language (XML)-based policy document that can leverage business rules and/or routes to other APIs and/or software components in compliance with a message-oriented middleware runtime environment (e.g., an Apache Camel runtime environment). For example, the message-oriented middleware runtime environment may include a rule-based routing and mediation engine that provides an object-based implementation of various enterprise application integration patterns that enable a message to flow from one software component to another through channels, routing, and/or transformations. In some implementations, the XML-based policy document may use a declarative domain specific language to configure routing and mediation rules, whereby the XML-based policy document can serve as an alternative to Java code or other compiled object-oriented code implemented in the API format. In some implementations, the XML-based policy document may be deployed, hosted, and executed in a shared runtime environment, which may significantly reduce an infrastructure footprint, encourage faster development cycles, and simplify governance, management, and/or cyber vulnerability remediation cycles relative to multiple APIs that each require a dedicated runtime infrastructure.

Figure 1B:
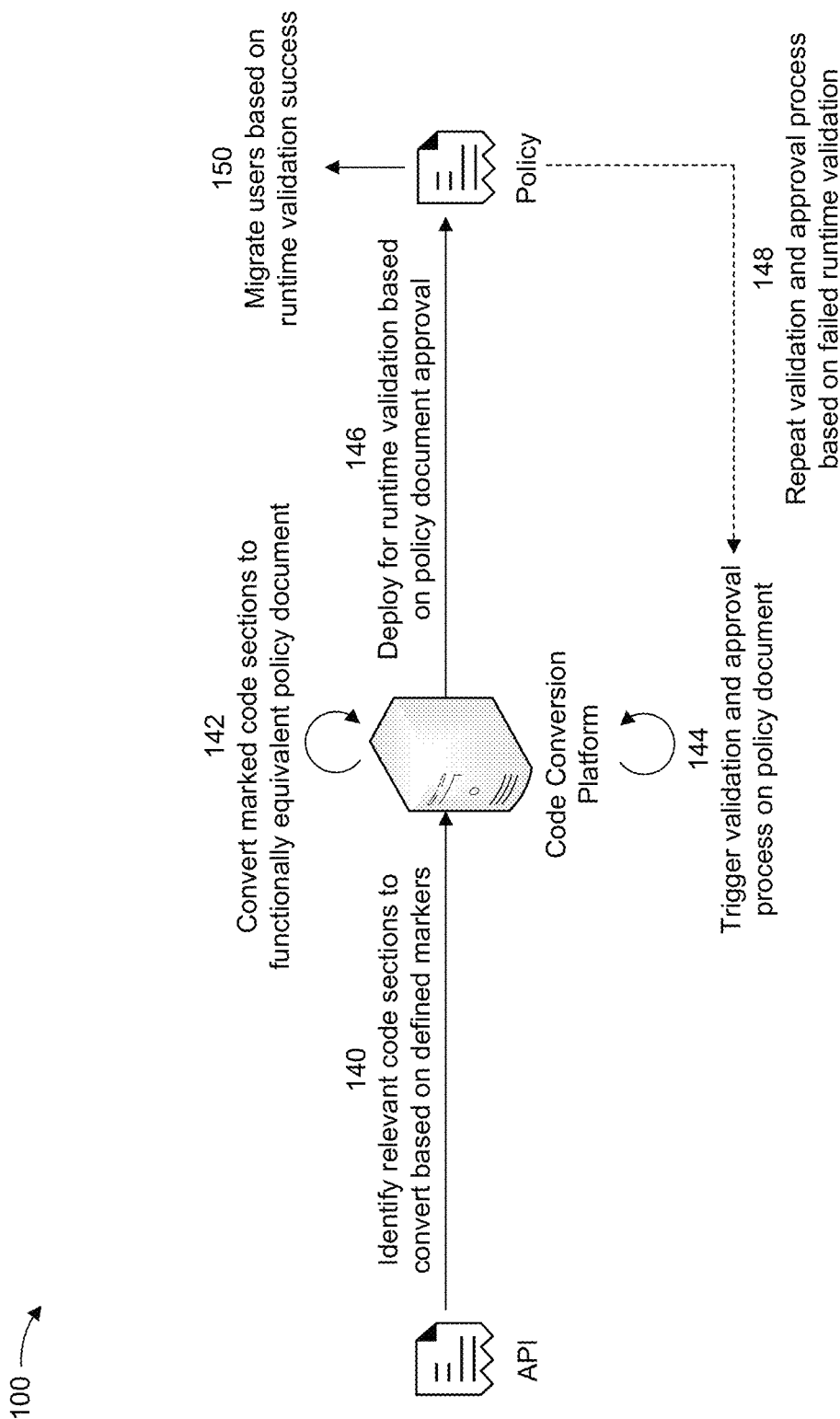

FIGS. 1A-1B are diagrams of an example implementation 100 associated with converting source code from an API to a lightweight document format. As shown in FIGS. 1A-1B, example implementation 100 includes a code conversion platform and one or more runtime environments, which may include a first runtime environment in which multiple APIs are configured to execute on respective dedicated runtime infrastructures and a second runtime environment in which multiple executable policy documents may be configured to execute on a shared runtime infrastructure. The code conversion platform and the runtime environment(s) are described in more detail below in connection with FIG. 2 and FIG. 3.

As shown in FIG. 1A, and by reference number 110, the code conversion platform may receive source code associated with multiple APIs that are configured to execute on dedicated runtime infrastructures. In some implementations, the runtime environment that hosts the multiple APIs may generally include a controlled cloud environment in which runtime computing resources (e.g., processor resources, memory resources, storage resources, and/or networking resources, among other examples) are virtualized, and each API may be hosted and executed on a separate runtime infrastructure (e.g., a portion of the runtime computing resources available in the runtime environment). For example, the multiple APIs may each be written in a respective compiled object-oriented programming language (e.g., Java or Go, among other examples), and each API may include one or more configuration elements that require a separate runtime infrastructure. Accordingly, in cases where there are one or more changes to the source code associated with the APIs deployed in the runtime environment (e.g., integrating a new API or new API functionality and/or reversing code changes implemented in one or more updates to an existing API), there may be a significant time and/or infrastructure cost to deploy the one or more changes.

Accordingly, as further shown in FIG. 1A, and by reference number 120, the code conversion platform may convert the source code associated with the APIs that are deployed in the runtime environment to executable policy documents that are compatible with a lightweight document format. For example, in some implementations, the executable policy documents may be compatible with an integration framework (e.g., the open source Apache Camel integration framework) that includes a rule-based routing and mediation engine that provides a Java object-based implementation to support various enterprise integration patterns (e.g., related to file transfer, shared databases, remote procedure invocation, and/or messaging). In some implementations, the integration framework may expose one or more domain-specific language components and/or XML components that can be used to configure an executable policy document that is functionally equivalent to an API. For example, in some implementations, the APIs that the code conversion platform converts into the executable policy documents may include representational state transfer (REST) APIs that adhere to one or more constraints related to scalable interactions between components, uniform interfaces, independent component deployments, and a layered architecture to reduce user-perceived latency, enforce security, and/or encapsulate legacy systems. For example, a REST API may generally be configured to receive one or more requests from one or more client devices, where the requests may include a get verb to read information from a data repository, a put verb to update or replace a row in a data repository, a patch verb to update or modify a row in a data repository, a post verb to create a new record in a data repository, and/or a delete verb to delete information from a data repository. The REST API may then query the appropriate data repository or data repositories to obtain any information needed to process the requests, and may then send a response back to the client devices (e.g., in a JavaScript Object Notation (JSON) or XML format).

Accordingly, the source code associated with the multiple APIs may generally include various code sections that implement one or more function calls related to receiving, processing, and/or responding to requests from client devices. For example, the function calls implemented in the code sections may be configured to perform data retrieval, data validation, data transformation, and/or API calling (e.g., invoking another API), among other examples. In general, the function calls that are implemented in the code sections of the source code associated with the multiple APIs may be supported by one or more components of the integration framework. For example, the integration framework may include a REST component that exposes REST services or calls external REST services, whereby an executable policy document created in the integration framework may be configured to be functionally equivalent to a REST API. For example, as described in further detail below with reference to FIG. 1B, the code conversion platform may receive API source code that includes code sections implementing one or more function calls (e.g., data transformation, data validation, or API calling), and may generate an executable policy document that performs the functionality associated with the one or more function calls. In this way, the executable policy documents may be functionally equivalent to the source code associated with the multiple APIs. Accordingly, as described in further detail elsewhere herein, the code conversion platform may receive source code associated with multiple APIs that are deployed on dedicated runtime infrastructures and convert the source code associated with each API into an executable policy document that is functionally equivalent to the respective API. In this way, the executable policy documents may have a lightweight document-based (e.g., XML) format that offers the same functional features as an API and a reduced infrastructure footprint and simpler manageability relative to an API.

As further shown in FIG. 1A, and by reference number 130, the code conversion platform may deploy the executable policy documents that are created from the source code associated with the multiple APIs in a common runtime environment that includes a shared runtime infrastructure that may support multiple executable policy documents. In some implementations, after the executable policy documents have been suitably deployed, the runtime infrastructures that had been allocated to the functionally equivalent APIs may be deallocated (e.g., released). In this way, multiple APIs that each require a dedicated runtime infrastructure may be converted to functionally equivalent executable policy documents that can be deployed, hosted, and executed in a single runtime environment. In this way, converting the source code from the API format to the executable policy document format (e.g., Apache Camel) may significantly reduce an infrastructure footprint, encourage faster development cycles, and simplify governance, management, and/or cyber vulnerability remediation cycles relative to multiple APIs that each require a dedicated runtime infrastructure. Furthermore, because the executable policy documents have a lightweight document format, the executable policy documents can be quickly deployed in the target runtime environment, and may provide an agile approach to changing, integrating, governing, remediating, and/or otherwise managing code.

Referring now to FIG. 1B, an example process to convert source code associated with an API format (e.g., Java or Go) into a lightweight document format (e.g., Apache Camel) is described. For example, as shown by reference number 140, the code conversion platform may receive source code that corresponds to an API to be converted to the lightweight document format, and the code conversion platform may identify one or more relevant code sections to be converted based on one or more markers that are defined within the source code. For example, as described above, the source code may generally include code sections that implement one or more function calls, such as a data transformation function call, a data validation function call, a data retrieval function call, a data manipulation function call, and/or an API invocation function call, among other examples. Accordingly, in some implementations, one or more markers may be defined to indicate the relevant code sections that implement function calls associated with one or more function call types to be converted into the lightweight document format. For example, one or more delimiters, character sequences, text strings, and/or other markers may be defined to mark boundaries within the source code to identify the function calls to be converted. For example, a first marker may be defined to indicate the start of a code section having a particular type (e.g., data validation, data transformation, or API invocation) and a second marker may be defined to indicate the end of the code section. Furthermore, in some implementations, one or more intermediate markers may be defined to indicate breaks within the code section (e.g., lines where the code section stops and/or resumes).

In some implementations, the delimiters that are used to mark the code sections may be defined by one or more developers that review the source code associated with the API and identify the appropriate lines or sections of code within the source code. Additionally, or alternatively, the source code associated with the API may include dedicated classes associated with the function call types to be converted (e.g., a data validator may be implemented as a first class, a data transformer may be implemented as a second class, an API invocation function call may be implemented as a third class, and so on). In this case, a developer or an automated utility may identify the function call that is implemented in a particular class and mark the class to indicate the type of function call. Additionally, or alternatively, an automated utility may linearly read the source code to identify the lines or sections of code that implement certain function calls based on a standard nomenclature used to represent different function call types. For example, in some implementations, the automated utility may linearly read the source code to be converted in order to identify function names that use certain terminology or keywords to identify the purpose of the function call and then insert the appropriate markers (e.g., marking a function named transformStringToDate as a data transformation function and/or marking a function named invokeSMS as an API call, among other examples). Additionally, or alternatively, the automated utility may linearly read the source code and insert the delimiters to mark the lines or sections of code to be converted, and a developer may review the delimiters inserted by the automated utility to validate that the lines or sections of code were correctly marked and/or to correct or augment the markings of the lines or sections in the code to be converted. Additionally, or alternatively, the source code associated with the API may include a separate file (e.g., a configuration file) that indicates the lines or sections of code that implement the relevant function calls to be converted into the lightweight document format.

As further shown in FIG. 1B, and by reference number 142, the code conversion platform may convert the marked code sections to a functionally equivalent policy document. For example, in some implementations, the code conversion platform may read the source code associated with the API in a linear manner to obtain text that corresponds to the lines or sections of code that implement the relevant function calls associated with the types to be converted, and the text that the code conversion platform obtains from linearly reading the source code associated with the API may be used to populate a policy document template that includes various placeholder elements for machine-readable text that is functionally equivalent to the lines or sections of code in the source code associated with the API. For example, as described above, the lightweight document format may be compliant with the Apache Camel integration framework, which exposes various components that can be used to create machine-readable text (e.g., an XML, document) that is functionally equivalent to an API function call. Accordingly, the code conversion platform may linearly read the source code associated with the API to identify the delimiters marking the lines or sections of code to be converted, and the code conversion platform may obtain text corresponding to the source code to be converted based on the delimiters. The code conversion platform may then populate the policy document template with properly formatted machine-readable text (e.g., in compliance with the lightweight document format) and/or may paste the text corresponding to the source code to be converted directly into the policy document template where the placeholder elements are located.

As further shown in FIG. 1B, and by reference number 144, the code conversion platform may trigger a validation and approval process on the executable policy document that is created by converting the marked lines or sections of code into the functionally equivalent executable policy document. For example, in some implementations, the code conversion platform may trigger a validation and approval process to be performed by a developer and/or an automated utility. In general, the validation and approval process may be designed to cross-check a sequence of steps to be performed by the machine-readable text included in the executable policy document against a sequence of steps performed by the original API. In some implementations, the validation and approval process may include a cross-check to verify that the sequence of steps to be performed by the machine-readable text included in the executable policy document matches the sequence of steps performed by the original API. For example, in some implementations, the cross-check may be performed with reference to a design document that defines or otherwise specifies details related to how the original API functions (e.g., based on a sequence diagram, a state diagram, and/or a flow diagram, among other examples). Accordingly, in some implementations, a developer may be tasked or a validation utility may be invoked to cross-check the executable policy document against a design document associated with the original API, and the code conversion platform may receive information that indicates whether the executable policy document satisfies all relevant functional requirements that may be described in the design document(s) associated with the API.

In some implementations, in cases where the code conversion platform receives an indication that the executable policy document fails to satisfy one or more relevant functional requirements described in the design document(s) associated with the API, the code conversion platform may generate a report that indicates the machine-readable text elements in the executable policy document that did not adhere to the functional requirements described in the design document(s) associated with the API. In this way, a developer or an automated utility may review the sections in the executable policy document that caused the validation and approval process to fail and attempt to correct the errors before reattempting the validation and approval process. As shown by reference number 146, if the code conversion platform receives an indication that the executable policy document satisfies the relevant functional requirements described in the design document(s) associated with the API, the code conversion platform may deploy the executable policy document in the common runtime environment for runtime validation based on an indication that the executable policy document satisfies the relevant functional requirements described in the design document(s) associated with the API. For example, after the executable policy document is deployed in the common runtime environment (e.g., the runtime environment in which runtime infrastructure is shared by multiple executable policy documents), the deployed policy document(s) should generally be able to be invoked.

Accordingly, the executable policy document may be deployed in a test environment where runtime validation may be performed. For example, the executable policy document may be executed in the test environment to extract information from the executable policy document and invoke the sections in the executable policy document that are supposed to be functionally equivalent to marked lines or sections of code in the source code associated with the API. For example, the test environment may be instrumented to algorithmically validate that the executable policy document satisfies one or more properties or required behaviors (e.g., avoiding a data race where two or more threads concurrently access a memory location with at least one thread performing a write operation and/or a deadlock condition where multiple threads concurrently lock the same resource). Additionally, or alternatively, one or more formal specifications may be used to define runtime properties to be satisfied (e.g., using finite state machines, regular expressions, context-free patterns, and/or linear temporal logics).

As further shown in FIG. 1B, and by reference number 148, the executable policy document may be returned to the code conversion platform to repeat the validation and approval process based on a failed runtime validation. For example, a failed runtime validation may include a report indicating one or more properties that were violated when the executable policy document was executed in the test environment (e.g., causing deadlock and/or code breakage in one or more included libraries, among other examples). In such cases, a developer and/or automated utility may attempt to resolve the errors that caused the runtime validation to fail (e.g., performing manual and/or automated debugging), and the executable policy document may then be deployed again for runtime validation after any changes are approved based on a validation against design documents associated with the API. Accordingly, the validation and approval process and the runtime validation process may be performed repeatedly until the executable policy document passes the runtime validation.

As further shown in FIG. 1B, and by reference number 150, the executable policy document may be deployed in the (live or production) common runtime environment based on a successful runtime validation. For example, in some implementations, the executable policy document may be deployed according to a deployment pattern that allows the executable policy document to be safely deployed with a minimal impact (e.g., minimal or no downtime). For example, in a rolling deployment pattern, the executable policy document may be deployed to the shared runtime infrastructure, one server at a time. Provided that no issues are discovered with the executable policy document, deployment may continue across the shared runtime infrastructure hosting the executable policy document until all servers are running the executable policy document. Similarly, in a canary deployment pattern, the executable policy document may be rolled out in staged releases, where certain users (rather than certain servers) are targeted to receive access to the executable policy document using throttling features and the executable policy document is later rolled out to other users if testing and/or feedback provided by the targeted users indicates that the executable policy document is working correctly. In another example, a blue-green deployment pattern may be used, where the shared runtime infrastructure includes one pipeline that feeds to two identical regions, which include an active (e.g., green) region and an idle (e.g., blue) region. In the blue-green deployment pattern, one region runs the API being converted and one region runs the executable policy document, and traffic may be switched from the region running the API to the region running the executable policy document. In another example, a programmatic toggle may be used, where the executable policy document may be turned on and/or off using a configurable flag. In some implementations, regardless of the particular deployment pattern that is used, the runtime infrastructure that had been allocated to the API may be deallocated after the executable policy document has been fully rolled out.

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged devices than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

FIG. 2 is a diagram of an example environment 200 in which systems and/or methods described herein may be implemented. As shown in FIG. 2, environment 200 may include a runtime environment 201, which may include one or more elements of and/or may execute within a cloud computing system 202. The cloud computing system 202 may include one or more elements 203-213, as described in more detail below. As further shown in FIG. 2, environment 200 may include a code conversion platform and/or a network 220. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the runtime environment 201 may include one or more elements 203-213 of the cloud computing system 202, may execute within the cloud computing system 202, and/or may be hosted within the cloud computing system 202, in some implementations, the runtime environment 201 may not be cloud-based (e.g., may be implemented outside of a cloud computing system) or may be partially cloud-based. For example, the runtime environment 201 may include one or more devices that are not part of the cloud computing system 202, such as device 300 of FIG. 3, which may include a standalone server or another type of computing device. The runtime environment 201 may perform one or more operations and/or processes described in more detail elsewhere herein.

Code conversion platform 220 includes one or more devices that can receive, generate, store, process, provide, and/or route information associated with converting source code from an API format to a lightweight document format, as described in more detail elsewhere herein. Code conversion platform 220 may include a communication device and/or a computing device. For example, code conversion platform 220 may include a server, such as an application server, a client server, a web server, a database server, a host server, a proxy server, a virtual server (e.g., executing on computing hardware), or a server in a cloud computing system. In some implementations, code conversion platform 220 includes computing hardware used in a cloud computing environment.

Network 230 includes one or more wired and/or wireless networks. For example, network 230 may include a cellular network, a public land mobile network (PLMN), a local area network (LAN), a wide area network (WAN), a private network, the Internet, and/or a combination of these or other types of networks. The network 230 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
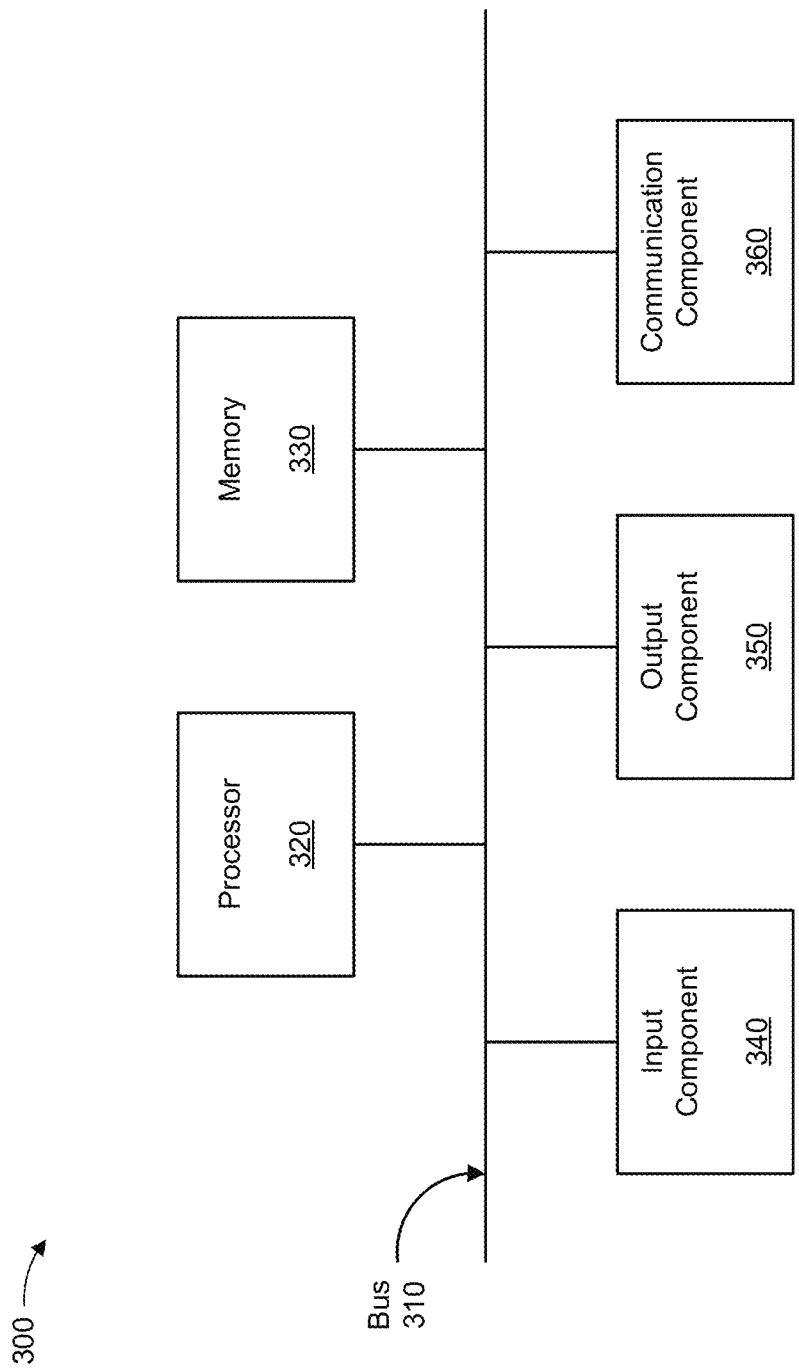
FIG. 3 is a diagram of example components of one or more devices of FIG. 2.

FIG. 3 is a diagram of example components of a device 300, which may correspond to runtime environment 201, cloud computing system 202, computing hardware 203, resource management component 204, host operating system 205, virtual computing system 206, and/or code conversion platform 220. In some implementations, runtime environment 201, cloud computing system 202, computing hardware 203, resource management component 204, host operating system 205, virtual computing system 206, and/or code conversion platform 220 may include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with source code conversion from an API to a lightweight document format. In some implementations, one or more process blocks of FIG. 4 may be performed by a code conversion platform (e.g., code conversion platform 220). In some implementations, one or more process blocks of FIG. 4 may be performed by another device or a group of devices separate from or including the code conversion platform, such as runtime environment 201, cloud computing system 202, computing hardware 203, resource management component 204, host operating system 205, virtual computing system 206. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving source code associated with multiple APIs that include at least a first API configured to execute on a first runtime infrastructure and a second API configured to execute on a second runtime infrastructure that is different from the first runtime infrastructure (block 410). As further shown in FIG. 4, process 400 may include identifying, in the source code associated with the multiple APIs, code sections implementing one or more function calls associated with one or more function call types to be converted into executable policy documents (block 420). As further shown in FIG. 4, process 400 may include generating multiple executable policy documents including machine-readable text that is functionally equivalent to the code sections implementing the one or more function calls associated with the one or more function call types to be converted (block 430). In some implementations, the multiple executable policy documents include at least a first executable policy document corresponding to the first API and a second executable policy document corresponding to the second API. As further shown in FIG. 4, process 400 may include deploying the multiple executable policy documents in a common runtime environment in which the multiple executable policy documents are configured to execute on a shared runtime infrastructure (block 440).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising
receiving, by a device, code associated with an application program interface (API) configured to execute on a particular runtime environment;
identifying, by the device, one or more code sections associated with the code that implement one or more function calls;
generating, by the device, an executable policy document including machine-readable text based on the one or more code sections implementing the one or more function calls;
invoking, by the device, a validation utility to validate the executable policy document based on a design document associated with the API,
wherein invoking the validation utility comprises receiving information indicating whether the executable policy document satisfies one or more functional requirements described in the design document;
deploying, by the device, the executable policy document in a common runtime environment that supports multiple executable policy documents based on the validation utility indicating that the executable policy document satisfies functional requirements described in the design document; and
deallocating, based on deploying the executable policy document in the common runtime environment, resources associated with the particular runtime environment.

2. The method of claim 1, wherein the code is associated with multiple APIs including the API.

3. The method of claim 1, wherein the code is associated with multiple APIs including the API,
wherein the code includes one or more dedicated classes implementing a corresponding one of the one or more function calls, and
wherein the one or more function calls are to be converted to different types of function calls.

4. The method of claim 1, wherein the code includes one or more delimiters that mark the one or more code sections.

5. The method of claim 1, wherein the code is associated with one or more APIs, that include the API, that are configured to execute on one or more different runtime environments, that include the particular runtime environment.

6. The method of claim 1, further comprising:
performing validation to check the multiple executable policy documents against a plurality of design documents associated with multiple APIs including the API.

7. The method of claim 6, further comprising:
repeating performing the validation based on failed validation.

8. A device, comprising:
one or more memories; and
one or more processors, coupled to the one or more memories, configured to:
   receive code associated with an application program interface (API) configured to execute on a particular runtime environment;
   identify one or more code sections associated with the code that implement one or more function calls;
   generate an executable policy document including machine-readable text based on the one or more code sections implementing the one or more function calls; invoke a validation utility to validate the executable policy document based on a design document associated with the API,
      wherein invoking the validation utility comprises receiving information indicating whether the executable policy document satisfies one or more functional requirements described in the design document;
   deploy the executable policy document in a common runtime environment that supports multiple executable policy documents based on the validation utility indicating that the executable policy document satisfies functional requirements described in the design document; and
   deallocate, based on deploying the executable policy document in the common runtime environment, resources associated with the particular runtime environment.

9. The device of claim 8, wherein the code is associated with multiple APIs including the API.

10. The device of claim 8, wherein the code is associated with multiple APIs including the API,
   wherein the code includes one or more dedicated classes implementing a corresponding one of the one or more function calls, and
   wherein the one or more function calls are to be converted to different types of function calls.

11. The device of claim 8, wherein the code includes one or more delimiters that mark the one or more code sections.

12. The device of claim 8, wherein the code is associated with one or more APIs, that include the API, that are configured to execute on one or more different runtime environments, that include the particular runtime environment.

13. The device of claim 8, wherein the one or more processors are further configured to:
   perform validation to check the multiple executable policy documents against a plurality of design documents associated with multiple APIs including the API.

14. The device of claim 13, wherein the one or more processors are further configured to:
   repeat performing the validation based on failed validation.

15. A non-transitory computer-readable medium storing a set of instructions, the set of instructions comprising:
   one or more instructions that, when executed by one or more processors of a device, cause the device to:
      receive code associated with an application program interface (API) configured to execute on a particular runtime environment;
      identify one or more code sections associated with the code that implement one or more function calls;
      generate an executable policy document including machine-readable text based on the one or more code sections implementing the one or more function calls; invoke a validation utility to validate the executable policy document based on a design document associated with the API,
         wherein invoking the validation utility comprises receiving information indicating whether the executable policy document satisfies one or more functional requirements described in the design document;
      deploy the executable policy document in a common runtime environment that supports multiple executable policy documents based on the validation utility indicating that the executable policy document satisfies functional requirements described in the design document; and
      deallocate, based on deploying the executable policy document in the common runtime environment, resources associated with the particular runtime environment.

16. The non-transitory computer-readable medium of claim 15, wherein the one or more instructions, that cause the device to invoke the validation utility, cause the device to:
   receive information indicating whether the executable policy document satisfies one or more functional requirements described in the design document.

17. The non-transitory computer-readable medium of claim 15, wherein the code is associated with multiple APIs.

18. The non-transitory computer-readable medium of claim 15, wherein the code is associated with multiple APIs including the API,
   wherein the code includes one or more dedicated classes implementing a corresponding one of the one or more function calls, and
   wherein the one or more function calls are to be converted to different types of function calls.

19. The non-transitory computer-readable medium of claim 15, wherein the one or more instructions further cause the device to:
   deallocate, based on deploying the executable policy document in the common runtime environment, resources associated with the particular runtime environment.

20. The non-transitory computer-readable medium of claim 15, wherein the code includes one or more delimiters that mark the one or more code sections.

21. The non-transitory computer-readable medium of claim 15, wherein the one or more instructions further cause the device to:
   perform validation to check the multiple executable policy documents against a plurality of design documents associated with multiple APIs including the API.

22. The non-transitory computer-readable medium of claim 15, wherein the one or more instructions further cause the device to:
  repeat performing the validation based on failed validation.

* * * * *